(12) United States Patent
Mizukami et al.

(10) Patent No.: US 8,098,975 B2
(45) Date of Patent: Jan. 17, 2012

(54) VIDEO RECORDING APPARATUS AND METHOD, VIDEO TRANSMISSION METHOD, PROGRAM FOR VIDEO RECORDING METHOD, AND STORAGE MEDIUM HAVING STORED PROGRAM FOR VIDEO RECORDING METHOD

(75) Inventors: Kenichi Mizukami, Kanagawa (JP); Kenichiro Aridome, Kanagawa (JP)

(73) Assignee: Sony Corporation (JP)

( * ) Notice: Subject to any disclaimer, the term of this patent is extended or adjusted under 35 U.S.C. 154(b) by 1272 days.

(21) Appl. No.: 11/605,210

(22) Filed: Nov. 28, 2006

(65) Prior Publication Data
US 2007/0166006 A1 Jul. 19, 2007

(30) Foreign Application Priority Data
Nov. 28, 2005 (JP) .............................. P2005-341782

(51) Int. Cl.
*H04N 9/80* (2006.01)
(52) U.S. Cl. ....................................... 386/241; 386/332
(58) Field of Classification Search .................. 386/241, 386/247, 326, 332, 344
See application file for complete search history.

(56) References Cited

U.S. PATENT DOCUMENTS

| | | | | |
|---|---|---|---|---|
| 5,535,008 A | * | 7/1996 | Yamagishi et al. | 386/109 |
| 5,771,334 A | * | 6/1998 | Yamauchi et al. | 386/95 |
| 6,112,009 A | * | 8/2000 | Kikuchi et al. | 386/95 |
| 6,385,389 B1 | * | 5/2002 | Maruyama et al. | 386/95 |

FOREIGN PATENT DOCUMENTS

| | | |
|---|---|---|
| JP | 10-283155 A | 10/1998 |
| JP | 11-288562 A | 10/1999 |
| JP | 2004-199774 A | 7/2004 |
| JP | 2004-201170 A | 7/2004 |
| JP | 2004-213706 A | 7/2004 |
| JP | 2004-312663 A | 11/2004 |
| JP | 2004-318926 A | 11/2004 |
| JP | 2004-350251 A | 12/2004 |
| JP | 2005-079823 A | 3/2005 |

* cited by examiner

*Primary Examiner* — Huy T Nguyen
(74) *Attorney, Agent, or Firm* — Lerner, David, Littenberg, Krumholz & Mentlik, LLP

(57) ABSTRACT

A video recording apparatus includes a data acquisition section, an encoding section, and a recording section. With a plurality of groups of pictures corresponding to a cell in an optical disk format set as a recording unit, the encoding section generates streaming data by time division multiplexing of encoded data using fixed-data-length packs according to the optical disk format, and multiplexes to the streaming data specific information that includes information necessary for generating a navigation pack in the optical disk format and that is difficult to obtain without analyzing the packs containing the encoded video and audio data, such that the specific information is assigned to each of the groups of pictures using a private pack in the streaming data.

13 Claims, 14 Drawing Sheets

FIG. 3

MV DATA

| | FIELD | BYTE | VALUE |
|---|---|---|---|
| M_ID | MV_DAT_ID | 8 | MVI_DATA |
| | MV_DAT_VER | 2 | 1.00 |
| | RESERVED | 2 | |
| MV_APL | VND_NAME | 5 | VENDOR NAME |
| | PRD_NAME | 12 | PRODUCT NAME |
| | APL_ID | 1 | APPLICATION ID |
| | MNFI_DATA | 128 | |
| | RESERVED | 2 | |
| GSI | GSI_VALID | 1 | 1:VALID,0:INVALID,OTHERS:RESERVED |
| | RESERVED | 3 | |
| | GOP SEARCH INFORMATION(LIKE DVD-VIDEO::NV::DSI::VOBU_SRI) | 152 | |
| RSI | RESERVED(FFh) | 36 | |
| | RUV_SIZE | 4 | THE SIZE OF RUV CONTAINING THE PRESENT GOP |
| | PRERUV_LGOP_OFFSET | 4 | THE AMOUNT OF OFFSET OF THE LAST GOP CONTAINED IN IMMEDIATELY PREVIOUS RUV, RELATIVE TO ADDRESS OF TOP OF THE PRESENT RUV |
| | RESERVED | 56 | |
| FFU | FFU_DATA | 1587 | |

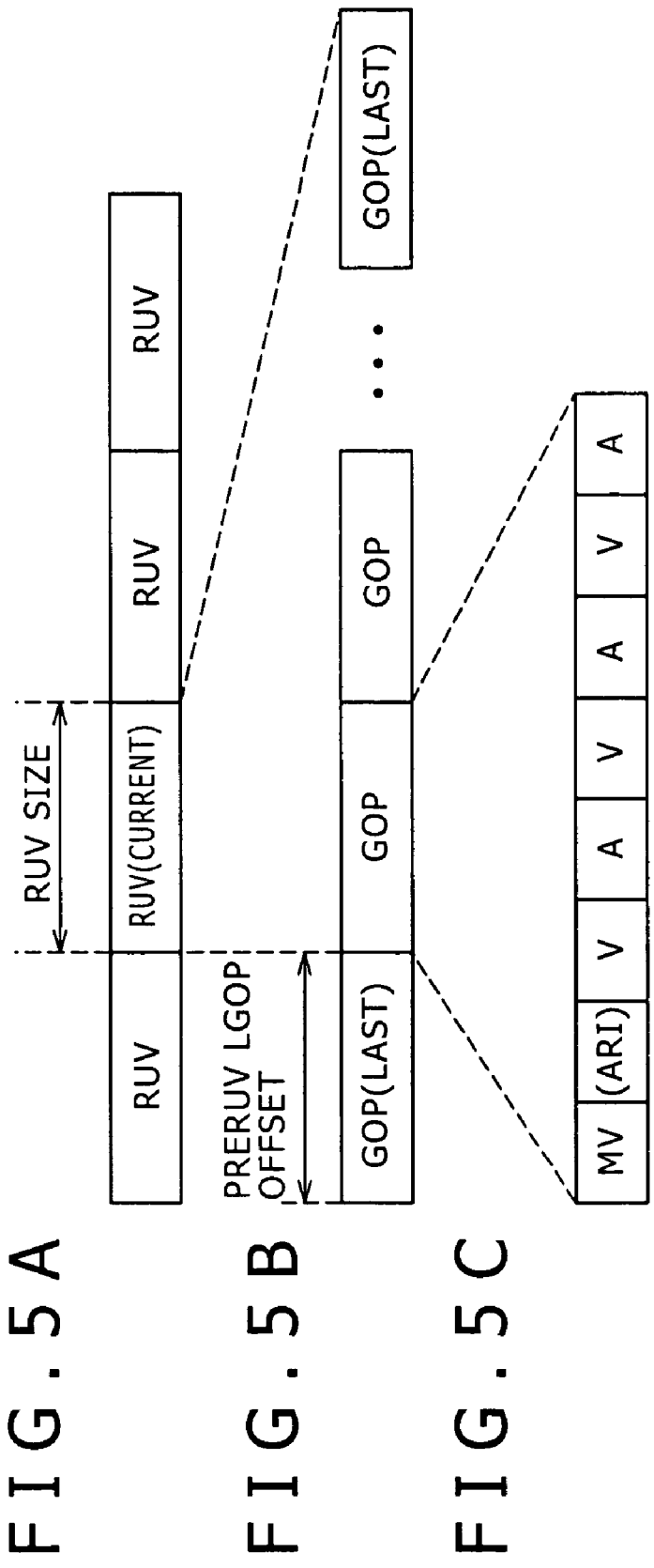

FIG. 6

| | |
|---|---|
| VIDEO STREAM | MPEG1/MPEG2 |
| TV SYSTEM | NTSC/PAL |
| HORIZONTAL SIZE | |
| DISPLAY HORIZONTAL SIZE | |
| ASPECT RATIO | 16:9 / 4:3 |
| E-STD STANDARD COMPLIANCE INFORMATION | COMPLIANT/NON-COMPLIANT |
| VIDEO GAP PRESENCE INFORMATION | YES/NO |
| RDI PACK PRESENCE INFORMATION | YES/NO |
| AUDIO ALIGNMENT INFORMATION | ALIGNMENT/NON-ALIGNMENT |
| SPU PACK PRESENCE INFORMATION | YES/NO |
| VOBU SIZE | |
| P-STD BUFFER AREA INFORMATION | YES/NO |
| VOBU START PTM | |
| VOBU END PTM | |
| 1st REFERENCE OFFSET | |
| 2nd REFERENCE OFFSET | |
| 3rd REFERENCE OFFSET | |
| 1st VIDEO PACK START ADDRESS | |
| NUMBER OF AUDIO STREAMS | |
| AUDIO SUB STREAM ID | DOLBY AC-3, LPCM, MPEG2 AUDIO LAYER-2 etc. |
| AUDIO CODEC INFORMATION | DOLBY AC-3, LPCM, MPEG2 AUDIO LAYER-2 etc. |
| QUANTIZATION/DRC FS | 44.1KHz, 32KHz, 48KHz |
| NUMBER OF AUDIO CHANNELS | |
| 1st AUDIO PACK START ADDRESS | |
| AUDIO SYNC_A INFORMATION | |
| NUMBER OF SUB PICTURES | |
| SP SUB STREAM ID | SUB PICTURE etc. |
| 1st SP PACK START ADDRESS | |
| SPU SYNC_A INFORMATION | |
| PXD INFORMATION | TOP/BOTTOM SAME/DIFFERENT |

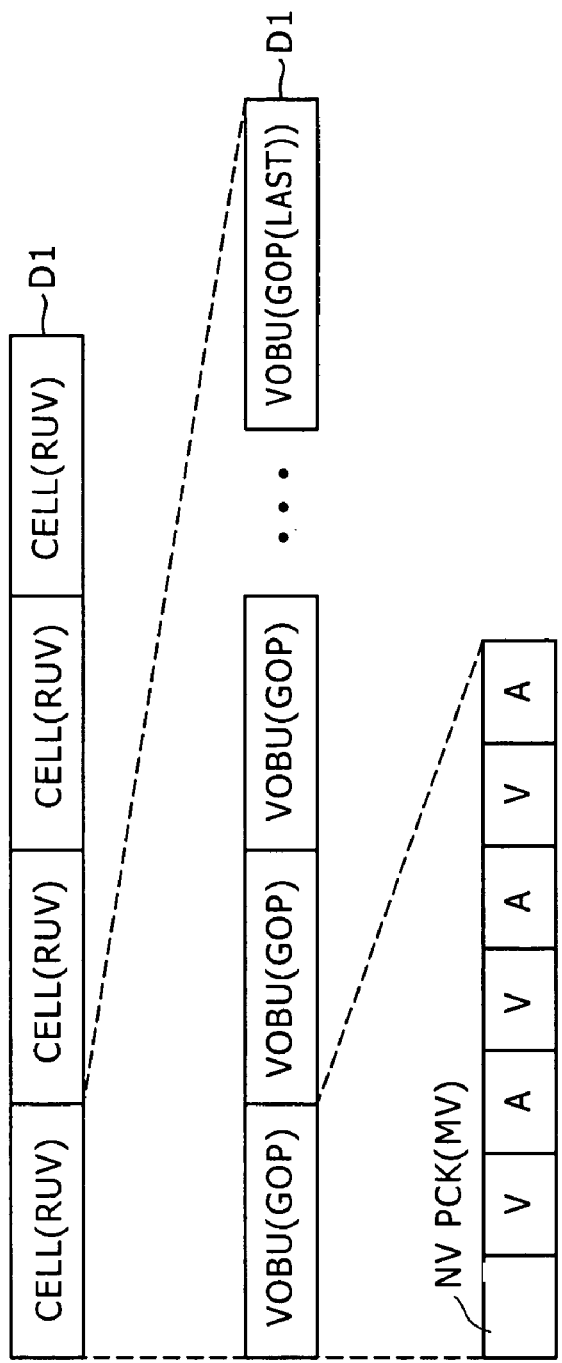
F I G. 8 A
F I G. 8 B
F I G. 8 C

FIG. 11

| ARI PCK | ADDITIONAL RECORDING INFORMATION IDENTIFIER | |
|---|---|---|
| | ARI DAT ID | ADDITIONAL RECORDING INFORMATION DATA IDENTIFIER |
| | ARI DAT VER | ADDITIONAL RECORDING INFORMATION VERSION |
| | APPLICATION INFORMATION | |
| | VND NAME | VENDOR NAME |
| | PRD NAME | PRODUCT NAME |
| | API ID | APPLICATION IDENTIFIER |
| | MNFI DATA | MANUFACTURER INFORMATION DATA |
| | PRD TYP | PRODUCT TYPE |
| | RECORDING TIME INFORMATION | |
| | VOBU LCL TM ZOME | TIME ZONE FOR ARI DATA RECORDING |
| | VOBU REC TM | ARI DATA RECORDING TIME |
| | CAMERA INFORMATION | |
| | F NUM | F NUMBER |
| | EXP TM | EXPOSURE TIME |
| | EXP PRG | EXPOSURE PROGRAM |
| | EXP BIS VAL | EXPOSURE COMPENSATION VALUE |
| | AGC | GAIN VALUE |
| | MAX APE VAL | MINIMUM LENS F VALUE |
| | FLS | FLASH |
| | FCL LEN | LENS FOCAL LENGTH |
| | WHT BAL | WHITE BALANCE |
| | SCN CAP TYP | CAPTURED SCENE TYPE |
| | FCS MOD | FOCUS MODE |
| | FCS POS | SUBJECT DISTANCE |
| | IMG STB | HAND MOVEMENT COMPENSATION |
| | STB LIM | HAND MOVEMENT COMPENSATION LIMIT |
| | DIG ZOM | DIGITAL ZOOM RATIO |
| | EFFECT | EFFECT CAPTURING |

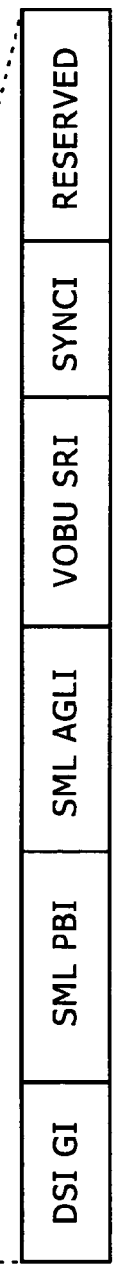
FIG. 14A
FIG. 14B

VIDEO RECORDING APPARATUS AND METHOD, VIDEO TRANSMISSION METHOD, PROGRAM FOR VIDEO RECORDING METHOD, AND STORAGE MEDIUM HAVING STORED PROGRAM FOR VIDEO RECORDING METHOD

CROSS-REFERENCE TO RELATED APPLICATIONS

The present application claims priority from Japanese Patent Application No. JP 2005-341782, filed on Nov. 28, 2005, the disclosure of which is hereby incorporated by reference herein.

BACKGROUND OF THE INVENTION

1. Field of the Invention

The present invention relates to a video recording apparatus, a video recording method, a video transmission method, a program for the video recording method, and a storage medium having stored the program for the video recording method. For example, the present invention can be applied to a video camera that employs a hard disk drive for its recording medium. In the present invention, while compressed video and audio data are multiplexed together using fixed-data-length packs according to an optical disk format, specific information that includes information necessary for generating a navigation pack and is difficult to obtain without analyzing the video and audio data packs is added to streaming data such that the specific information is assigned to each GOP in the streaming data. This considerably shortens the time necessary for recording onto an optical disk, such as a DVD, as compared with in related art.

2. Description of the Related Art

In recent years, there has been provided a portable video camera, which is a video recording apparatus, employing a hard disk drive, a magnetic tape, or the like for its recording medium and records a video captured thereby on the recording medium. Such a video recording apparatus records streaming data containing video data and audio data on the recording medium using the MPEG (Moving Picture Experts Group)-2 technology. In this process, the video and audio data are compressed while a sequence of GOPs (Group Of Pictures) are set, and the resultant encoded data is subjected to time division multiplexing to generate the streaming data.

In contrast, a DVD (Digital Versatile Disk) recorder, which is a similar video recording apparatus, compresses the video and audio data using the MPEG-2 technology as does the above-described portable video camera, and records the resultant data on a DVD which is an optical disk according to a specified format.

As illustrated in FIG. 12A, the DVD recorder records the video and audio data while dividing information recording surface of the DVD into a lead-in area (innermost), a file system area, a management information area, a data recording area, and a lead-out area.

The file system area and the management information area are recording areas for storing management information used for managing video data files recorded on the DVD, and are provided with UDF (Universal Disk Format) and VMG (Video Manager), respectively.

The UDF is an area corresponding to a file management system of a computer that complies with ISO 9660 and UDF specifications, and stores management information used for managing the data recording area using a format designed to achieve compatibility with the file system of the computer.

In contrast, as illustrated in FIG. 12C, the VMG is an area for management information for a DVD player/recorder, and management information for the VMG is stored in VMGI (VMG Information), which is located at the top of the VMG. VMGM VOBS (Video OBject Set for VMG Menu), which follows the VMGI, stores actual data of the VMG. VMGI BUP (VMGI for Back UP), which follows the VMGM VOBS, stores a backup copy of the VMGI.

The data recording area is a recording area used for storing actual data of the DVD, and stores the encoded video and audio data obtained from the MPEG-2 data compression with a video title set (VTS) as a basic unit. As illustrated in FIG. 12D, each video title set (VTS) is composed of VTSI (Video Title Set Information), VTSM VOBS (Video Object Set for the VTSM), VTSTT VOBS (Video Object Set for Titles in a VTS), and VTSI BUP (Backup of VTSI), which are arranged in this order.

The VTSTT VOBS stores the encoded video and audio data. The VTSI stores storage position information which is management information used for managing the actual data stored in the VTSTT VOBS, and the like. The VTSM VOBS stores a title menu of the video data. Note that the VTSM VOBS is optional. The VTSI BUP is a backup copy of the VTSI.

In this type of optical disks, when access is made from the computer, the UDF is used to search for and reproduce a desired file, whereas when access is made from the DVD player/recorder, the VMG is used to search for and reproduce a desired file.

FIGS. 13A to 13F are diagrams illustrating the details of the VTSTT VOBS. Hereinafter, the VTSTT VOBS will be referred to as "VOBS" for short when appropriate. Incidentally, the VMGM VOBS and the VTSM VOBS store their respective actual data according to the same format as shown in FIGS. 13A to 13F.

The VTSTT VOBS is a collection of one or more video objects (VOBS). Each VOB is assigned a VOB ID, which is an identification code, and is composed of one or more cells (Cells). Each cell is assigned a cell ID, which is an identification code, and is provided with one or more video object units (VOBUs).

Each VOBU is constructed of one GOP assigned thereto, and is constructed of a sequence of packs with a navigation pack (NV PCK) located at the top. Each of the packs has a fixed data length of 2048 bytes. Each VOBU has the navigation pack arranged at the top and is also provided with a video pack (V PCK) that stores the encoded video data, an audio pack (A PCK) that stores the encoded audio data, a subpicture pack (SP PCK) that stores subpicture data, etc.

The navigation pack (NV PCK) has assigned thereto control information necessary for reproducing the video and audio data contained in each cell. Specifically, the NV PCK has assigned thereto information of the video and audio data contained in the GOP within the VOBU to which the NV PCK belongs, information indicating relationships with other VOBUs that are reproduced in combination, and so on.

As such, the navigation pack (NV PCK) is composed of a pack header, presentation control information (PCI), and data search information (DSI), which are arranged in this order. The presentation control information (PCI) has assigned thereto control information concerning reproduction display, such as angle information used for non-seamless reproduction and information used for highlight display of a subpicture. The data search information (DSI) has assigned thereto control information concerning access.

As illustrated in FIGS. 14A and 14B, the data search information (DSI) is constructed of DSI GI, SML PBI, SML AGLI, VOBU SRI, and SYNCI, and subsequent to the SYNCI, a reserved area is provided.

The DSI GI stores, as general information, a logical block number of the corresponding navigation pack and position information concerning the DSI, such as an ending address of the VOBU. The SML PBI stores information necessary for realizing seamless reproduction, such as a category of seamless VOBU, reproduction start and end times of video within the VOB, and a reproduction end time of audio within the VOBU. The SML AGLI stores angle information used for seamless reproduction, which is information concerning a destination address at the time of angle change. In this SML AGLI, effective information is set when necessary.

The VOBU SRI stores a starting address of a VOBU that belong to the same cell and is reproduced within 0.5×n seconds before or after the reproduction start time of the VOBU that contains the DSI to which the VOBU SRI belongs. Use of the information stored in the VOBU SRI enables VOBU-based search.

The SYNCI stores synchronization information, i.e., address information of the audio and subpicture data that are reproduced in synchronization with the video data within the VOBU that contains the DSI to which the SYNCI belongs.

As described above, the video recording apparatus that adopts the DVD format compresses the video data and the audio data using the MPEG-2 technology and subjects the navigation packs (NV PCKs) and the resulting encoded video and audio data to time division multiplexing to generate the streaming data. Then, the video recording apparatus records the streaming data on the DVD.

Regarding data recording onto the DVD, Japanese Patent Laid-open No. 2004-312663 and Japanese Patent Laid-open No. 2005-79823 have proposed techniques of assigning to the VOBU an additional information pack containing additional information in order to enhance the degree of convenience.

Some users sometimes upload a video captured and recorded by the portable video camera or the like to the computer, edit the video using an editing software program, and records the edited video on the DVD. In this case, from the fact that the portable video camera or the like also compresses the video and audio data using the MPEG-2 technology and records the compressed video and audio data, it might appear that the recording of the edited video on the DVD can be achieved by a simple process.

The fact is, however, that when recording the edited video on the DVD, it is necessary to analyze the compressed video and audio data to obtain data necessary for generation of the navigation pack (NV PCK), and that, unfavorably, this process takes much time.

SUMMARY OF THE INVENTION

An advantage of the present invention is to provide a video recording apparatus, a video recording method, a program for the video recording method, a storage medium having stored thereon the program for the video recording method, and a video transmission method employing the video recording method, which are capable of considerably shortening the time necessary for recording onto an optical disk, such as a DVD, as compared with in related art.

According to one embodiment of the present invention, there is provided a video recording apparatus including a data acquisition section configured to acquire video data and audio data; an encoding section configured to compress the acquired video data and audio data to generate encoded video and audio data while setting a sequence of GOPs for the acquired video data and audio data, and to subject the encoded video and audio data to time division multiplexing to output streaming data; and a recording section configured to record the streaming data on a recording medium. With a plurality of GOPs corresponding to a cell in an optical disk format set as a recording unit, the encoding section generates the streaming data by the time division multiplexing of the encoded video and audio data using fixed-data-length packs according to the optical disk format. The encoding section multiplexes to the streaming data specific information that includes information necessary for generating a navigation pack in the optical disk format and that is difficult to obtain without analyzing the packs containing the encoded video and audio data, such that the specific information is assigned to each of the GOPs using a private pack in the streaming data.

According to this embodiment, the streaming data makes it possible to obtain the information necessary for generating the navigation pack by reproducing the specific information without the need to reproduce and analyze the encoded video and audio data packs. This serves to simplify a process for generating the navigation pack, which considerably shortens the time necessary for recording onto an optical disk, such as a DVD, as compared with the related art.

According to another embodiment of the present invention, there is provided a video recording apparatus including a streaming data acquisition section configured to acquire first streaming data; a data processing section configured to convert the first streaming data into second streaming data used for recording onto an optical disk; and an optical disk recording section configured to record the second streaming data onto the optical disk. With a plurality of GOPs corresponding to a cell in an optical disk format set as a recording unit, the first streaming data is generated by time division multiplexing of encoded video and audio data obtained by compressing video data and audio data using fixed-data-length packs according to the optical disk format. Specific information that includes information necessary for generating a navigation pack in the optical disk format and that is difficult to obtain without analyzing the packs containing the encoded video and audio data is contained in the first streaming data, such that the specific information is assigned to each of the GOPs using a private pack in the first streaming data to be multiplexed. The data processing section is configured to generate the navigation pack in the optical disk format using the specific information, and to generate the second streaming data so as to be recorded onto the optical disk using the navigation pack and to set the recording unit as the cell.

According to this embodiment, since there is no need to reproduce and analyze the encoded video and audio data packs to generate the navigation pack, simplification of the process for generating the navigation pack is achieved. As a result, the time necessary for recording onto an optical disk, such as a DVD, can be considerably shortened as compared with the related art.

According to yet another embodiment of the present invention, there is provided a video recording method including acquiring video data and audio data; compressing the acquired video data and audio data to generate encoded video and audio data while setting a sequence of GOPs for the acquired video data and audio data, and subjecting the encoded video and audio data to time division multiplexing to output streaming data; and recording the streaming data on a recording medium. With a plurality of GOPs corresponding to a cell in an optical disk format set as a recording unit, the compressing step includes generating the streaming data by the time division multiplexing of the encoded video and audio data using fixed-data-length packs according to the optical disk format, and multiplexing to the streaming data specific information that includes information necessary for generating a navigation pack in the optical disk format and that is difficult to obtain without analyzing the packs containing the encoded video and audio data, such that the specific information is assigned to each of the GOPs using a private pack in the streaming data.

The video recording method according to this embodiment serves to considerably shorten the time necessary for recording onto an optical disk, such as a DVD, as compared with the related art.

According to yet another embodiment of the present invention, there is provided a video recording method including acquiring first streaming data; converting the first streaming data into second streaming data used for recording onto an optical disk; and recording the second streaming data onto the optical disk. With a plurality of GOPs corresponding to a cell in an optical disk format set as a recording unit, the first streaming data is generated by time division multiplexing of encoded video and audio data obtained by compressing video data and audio data using fixed-data-length packs according to the optical disk format. Specific information that includes information necessary for generating a navigation pack in the optical disk format and that is difficult to obtain without analyzing the packs containing the encoded video and audio data is contained in the first streaming data, such that the specific information is assigned to each of the GOPs so as to be multiplexed using a private pack in the first streaming data. The converting step includes generating the navigation pack in the optical disk format using the specific information, and generating the second streaming data using the navigation pack and setting the recording unit as the cell.

The video recording method according to this embodiment serves to considerably shorten the time necessary for recording onto an optical disk, such as a DVD, as compared with the related art.

According to yet another embodiment of the present invention, there is provided a video transmission method for transmitting, to a content client connected to a transmission source via a transmission path, streaming data generated by subjecting encoded data obtained by compressing video data and audio data to time division multiplexing using fixed-data-length packs, the method including multiplexing to the streaming data specific information that is difficult to obtain without analyzing the packs containing the encoded video and audio data and that is necessary for reproducing the streaming data, such that the specific information is assigned to each of a plurality of GOPs using a private pack in the streaming data; and transmitting the streaming data including the specific information multiplexed thereto in the multiplexing step.

According to this embodiment, while data corresponding to a recording unit and requested by the content client is transmitted, information that is necessary for reproducing the transmitted data corresponding to the recording unit can be efficiently transmitted and decoded by effectively utilizing an optical disk format without conflicting with the optical disk format or a format of this type of streaming data.

According to yet another embodiment of the present invention, there is provided a program to be executed by a processor to implement a video recording method for recording a video on a recording medium, the method including acquiring video data and audio data of the video; compressing the acquired video data and audio data to generate encoded video and audio data while setting a sequence of GOPs for the acquired video data and audio data, and subjecting the encoded video and audio data to time division multiplexing to output streaming data; and recording the streaming data on the recording medium. With a plurality of GOPs corresponding to a cell in an optical disk format set as a recording unit, the compressing step includes generating the streaming data by the time division multiplexing of the encoded video and audio data using fixed-data-length packs according to the optical disk format, and multiplexing to the streaming data specific information that includes information necessary for generating a navigation pack in the optical disk format and that is difficult to obtain without analyzing the packs containing the encoded video and audio data, such that the specific information is assigned to each of the GOPs using a private pack in the streaming data.

The program for the video recording method according to this embodiment serves to considerably shorten the time necessary for recording onto an optical disk, such as a DVD, as compared with the related art.

According to yet another embodiment of the present invention, there is provided a program to be executed by a processor to implement a video recording method for recording a video on an optical disk, the method including acquiring first streaming data; converting the first streaming data into second streaming data used for recording onto the optical disk; and recording the second streaming data onto the optical disk. With a plurality of GOPs corresponding to a cell in an optical disk format set as a recording unit, the first streaming data is generated by time division multiplexing of encoded video and audio data obtained by compressing video data and audio data using fixed-data-length packs according to the optical disk format. Specific information that includes information necessary for generating a navigation pack in the optical disk format and that is difficult to obtain without analyzing the packs containing the encoded video and audio data is contained in the first streaming data, such that the specific information is assigned to each of the GOPs using a private pack in the first streaming data so as to be multiplexed. The converting step includes generating the navigation pack in the optical disk format using the specific information, and generating the second streaming data so as to be recorded onto the optical disk using the navigation pack and setting the recording unit as the cell.

The program for the video recording method according to this embodiment serves to considerably shorten the time necessary for recording onto an optical disk, such as a DVD, as compared with the related art.

According to yet another embodiment of the present invention, there is provided a storage medium recorded with a program to be executed by a processor to implement a video recording method for recording a video on a recording medium, the method including acquiring video data and audio data of the video; compressing the acquired video data and audio data to generate encoded video and audio data while setting a sequence of GOPs for the acquired video data and audio data, and subjecting the encoded video and audio data to time division multiplexing to output streaming data; and recording the streaming data on the recording medium. With a plurality of GOPs corresponding to a cell in an optical disk format set as a recording unit, the compressing step includes generating the streaming data by the time division multiplexing of the encoded video and audio data using fixed-data-length packs according to the optical disk format, and multiplexing to the streaming data specific information that includes information necessary for generating a navigation pack in the optical disk format and that is difficult to obtain without analyzing the packs containing the encoded video and audio data, such that the specific information is assigned to each of the GOPs using a private pack in the streaming data.

The storage medium recorded with the program for the video recording method according to this embodiment serves to considerably shorten the time necessary for recording onto an optical disk, such as a DVD, as compared with the related art.

According to yet another embodiment of the present invention, there is provided a storage medium recorded with a program to be executed by a processor to implement a video recording method for recording a video on an optical disk, the method including acquiring first streaming data; converting the first streaming data into second streaming data used for recording onto the optical disk; and recording the second streaming data obtained by the converting step onto the optical disk. With a plurality of GOPs corresponding to a cell in an optical disk format set as a recording unit, the first streaming data is generated by time division multiplexing of encoded video and audio data obtained by compressing video data and audio data using fixed-data-length packs according to the optical disk format. Specific information that includes information necessary for generating a navigation pack in the optical disk format and that is difficult to obtain without analyzing the packs containing the encoded video and audio data is contained in the first streaming data, such that the specific information is assigned to each of the GOPs using a private pack in the first streaming data so as to be multiplexed. The converting step includes generating the navigation pack in the optical disk format using the specific information, and generating the second streaming data so as to be recorded onto the optical disk using the navigation pack and setting the recording unit as the cell.

The storage medium recorded with the program for the video recording method according to this embodiment serves to considerably shorten the time necessary for recording onto an optical disk, such as a DVD, as compared with the related art.

BRIEF DESCRIPTION OF THE DRAWINGS

FIG. 3 is a diagram for explaining a MV pack as illustrated in FIGS. 1C and 1D;

FIGS. 5A to 5C are diagrams for explaining position information different from that of FIGS. 4A and 4B;

FIG. 6 is a diagram for explaining information necessary in authoring;

FIGS. 8A to 8C are diagrams for explaining a recording format adopted by the editing apparatus of FIG. 7;

FIG. 11 is a diagram for explaining an additional recording information pack according to the editing system of FIG. 10;

FIGS. 14A and 14B are diagrams for explaining a navigation pack.

DETAILED DESCRIPTION

Hereinafter, embodiments of the present invention will be described in detail with reference to the accompanying drawings.

First Embodiment

1. Structure of Embodiment

Figure 2:
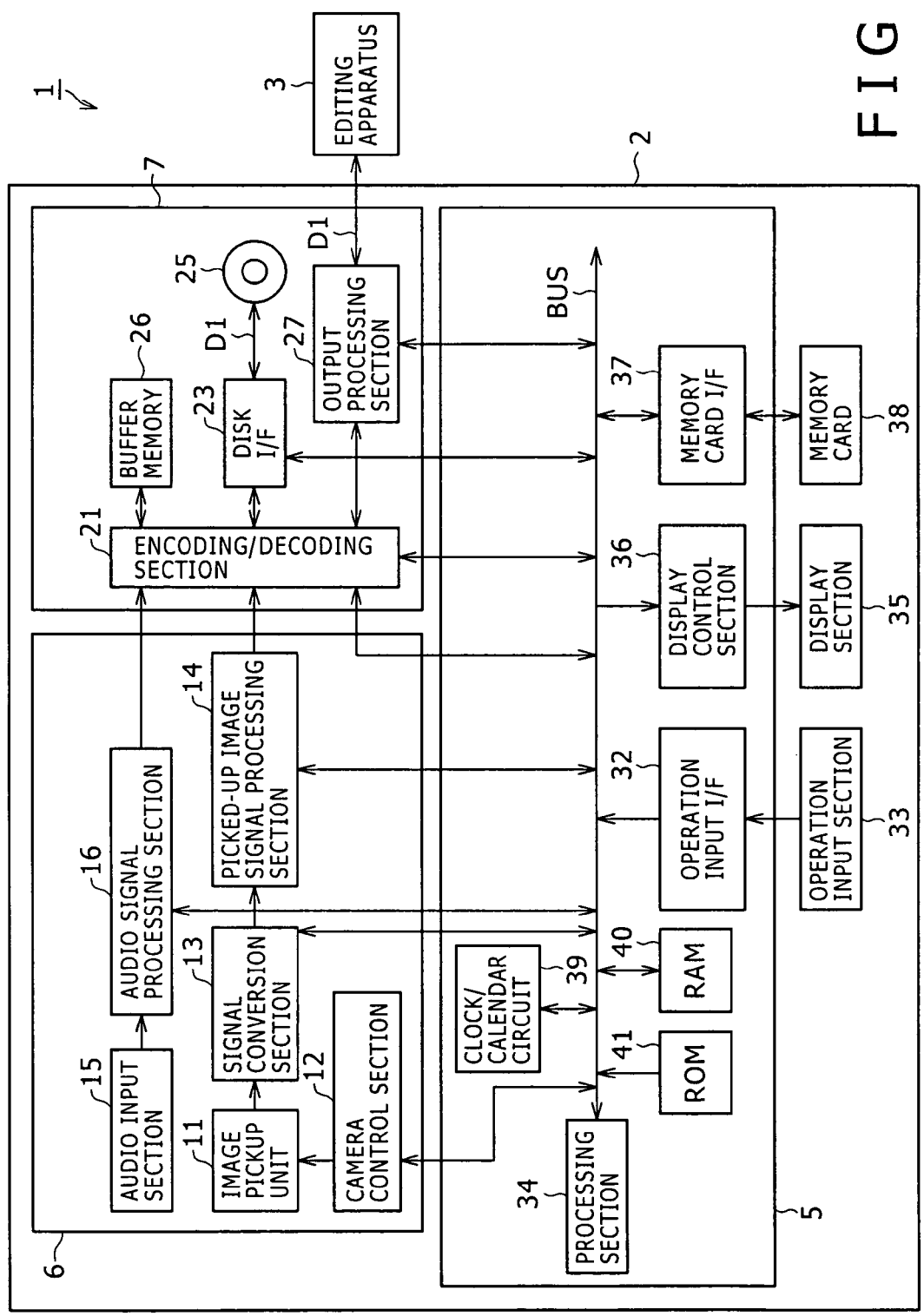
FIG. 2 is a block diagram illustrating the editing system according to the first embodiment of the present invention.

FIG. 2 is a block diagram illustrating an editing system 1 according to one embodiment of the present invention. In the editing system 1, a video camera 2 captures and records a video, and an editing apparatus 3 edits the recorded video and records the edited video on a DVD which is an optical disk.

While a control section 5 controls operations of a camera section 6 and a recording/reproducing processing section 7, the video camera 2 captures and records a video and outputs the recorded video to the editing apparatus 3.

In the video camera 2, under control of the control section 5, the camera section 6 acquires video and audio data by shooting and outputs the acquired video and audio data to the recording/reproducing processing section 7. Included in the camera section 6, an image pickup unit 11 is constructed of an image pickup device, such as a CCD (Charge Coupled Device), a lens for focusing incident light rays onto an image pickup surface of the image pickup device so that an optical image is formed on the image pickup surface, and the like. Under control of a camera control section 12, the image pickup unit 11 varies the lens power, the focus, the aperture, the shutter speed of the image pickup device, and the like, and outputs a picked-up image from the image pickup device. Under control of the control section 5, the camera control section 12 controls operation of the image pickup unit 11.

A signal conversion section 13 subjects the picked-up image outputted from the image pickup unit 11 to correlated double sampling, matrix operation, and the like to output color (red, green, and blue) signals. A picked-up image signal processing section 14 subjects the color signals outputted from the signal conversion section 13 to gamma adjustment, white balance adjustment, and the like, and thereafter converts the color signals to video data composed of a luminance signal and a color-difference signal and outputs the video data to the recording/reproducing processing section 7.

An audio input section 15 is formed by a built-in or external microphone. The audio input section 15 obtains an audio signal of a subject and outputs the audio signal. An audio signal processing section 16 subjects the audio signal outputted from the audio input section 15 to analog to digital conversion to generate audio data, and, after adjustment of gain, sound quality, and the like, outputs the audio data.

The recording/reproducing processing section 7 compresses the video data and the audio data outputted from the camera section 6 and records the compressed video and audio data on a recording medium. The recording/reproducing processing section 7 also reads the recorded video and audio data from the recording medium and outputs the read video and audio data to various parts. Specifically, in the recording/reproducing processing section 7, at the time of recording, an encoding/decoding section 21 compresses the video and audio data outputted from the camera section 6 according to a predetermined format to generate streaming data, and outputs the generated streaming data to a disk interface (disk I/F) 23. At the time of reproducing, the encoding/decoding section 21 decompresses the streaming data obtained from the disk interface 23 and outputs the resultant data to the control section 5 or the like. The encoding/decoding section 21 compresses the video and audio data using the MPEG-2 technology, and generates the streaming data according to a format described later.

The disk interface 23 is an interface for data exchange between a recording medium 25 and the encoding/decoding section 21. The disk interface 23 is used to record streaming data D1 outputted from the encoding/decoding section 21 on the recording medium 25 and also used to read the streaming data D1 from the recording medium 25 for output. The recording medium 25 is formed by a hard disk drive, for example, and used to record and reproduce a captured video. Instead of the hard disk drive, a magnetic tape, a memory card, various types of optical disks, and other recording media can be used for the recording medium 25. A buffer memory 26 is used to temporarily hold the video data and the like to be processed by the encoding/decoding section 21, and functions as an external memory for the encoding/decoding section 21. An output processing section 27 is an interface for data exchange between the encoding/decoding section 21 and an external device, the control section 5, or the like. Using the output processing section 27, the video camera 2 outputs the captured video read from the recording medium 25 and the captured video obtained from the camera section 6 to the editing apparatus 3, the control section 5, and the like.

The control section 5 controls the operations of various parts in accordance with user operations and also displays a monitor image of the captured video. Specifically, included in the control section 5, a clock/calendar circuit 39 measures the current time and outputs the current time found by the measurement to a BUS. An operation input interface (an operation input I/F) 32 reports a user operation detected via an operation input section 33 to a processing section 34 via the BUS. The operation input section 33 is formed by operation buttons provided on the video camera 2, a touch panel provided on a display section 35, their peripheral circuits, and the like. The operation input section 33 detects various operations by a user.

The display section 35 is a monitor mechanism for monitoring the captured video obtained by the camera section 6 and the captured video read from the recording medium 25. The display section 35 is formed by a liquid crystal display, for example. A display control section 36 drives the display section 35 based on the captured video outputted to the BUS. A memory card interface (a memory card I/F) 37 records the captured video outputted to the BUS on a memory card 38, and also reads a captured video recorded on the memory card 38 therefrom and outputs the captured video to the BUS.

The processing section 34 is a processor that executes a program stored in a read-only memory (ROM) 41 while securing a work area in a random-access memory (RAM) 40. By the execution of the program, the processing section 34 controls the operations of various parts in accordance with the user operations.

If the user issues an instruction to prepare for video capturing, the processing section 34 starts the operation of the camera section 6 and the recording/reproducing processing section 7 and allows the acquired video data and audio data outputted from the picked-up image signal processing section 14 and the audio signal processing section 16, respectively, to be inputted to the display control section 36 via the encoding/decoding section 21, the output processing section 27, and the BUS, so that the display section 35 displays the captured video. Thus, the user is able to monitor the captured video.

If the user issues an instruction to start recording while monitoring the captured video, the encoding/decoding section 21 starts encoding the video and audio data, and the resultant streaming data D1 is recorded on the recording medium 25. In the case where an instruction for recording onto the memory card 38 (instead of the recording medium 25) is issued, the streaming data D1 generated by the encoding/decoding section 21 is outputted to the memory card interface 37 via the output processing section 27 and the BUS, and the streaming data D1 is recorded on the memory card 38.

In contrast, if an instruction for monitoring of the captured video recorded on the recording medium 25 is issued by the user, an instruction to reproduce the captured video recorded on the recording medium 25 is issued, and the streaming data D1, which is accordingly read from the recording medium 25, is decoded by the encoding/decoding section 21. Then, the resultant video and audio data are inputted to the display control section 36 via the output processing section 27 and the BUS and displayed by the display section 35 for the user. In the case where an instruction for monitoring of the captured video recorded on the memory card 38 (instead of the recording medium 25) is issued by the user, the captured video recorded on the memory card 38 is subjected to similar processing and, eventually, displayed by the display section 35 for the user.

In the case where an instruction for download of the captured video recorded on the recording medium 25 is issued, the streaming data D1 is read from the recording medium 25 and then outputted to the editing apparatus 3 via the encoding/decoding section 21 and the output processing section 27 while the decoding by the encoding/decoding section 21 is suspended. In the case where an instruction for download of the captured video recorded on the memory card 38 (instead of the recording medium 25) is issued, the streaming data recorded on the memory card 38 is outputted to the editing apparatus 3 via the memory card interface 37, the BUS, and the output processing section 27.

In the above-described manners, the video camera 2 records, on the recording medium 25 or the memory card 38, the captured video in the form of the streaming data D1 adopting a specified format using the MPEG-2 technology. In the case of the download to the editing apparatus 3, the video camera 2 outputs the streaming data D1 to the editing apparatus 3.

The program that contributes to the processing by the processing section 34 is typically installed beforehand in the video camera 2. Alternatively, the program may be provided to the video camera 2 via an optical disk, a magnetic disk, a memory card, or another type of a storage medium that has stored therein the program. Alternatively, the program may be provided to the video camera 2 by downloading it from a network such as the Internet.

FIGS. 1A to 1D are diagrams illustrating a video file format of the streaming data recorded on the recording medium 25 as described above. In the present embodiment, the encoding/decoding section 21 encodes the video and audio data according to this format.

The encoding/decoding section 21 starts recording upon the user's operation of a trigger switch and stops recording upon the user's subsequent operation of the trigger switch, and thus generates one file during this period between the starting and stopping of recording. When the instruction to start recording has been issued, the encoding/decoding section 21 encodes the video and audio data sequentially inputted while partitioning them into a sequence of GOPs. The encoding/decoding section 21 subjects the resulting encoded video and audio data to time division multiplexing to generate the streaming data D1. In addition, the encoding/decoding section 21 provides the streaming data D1 with a header (not shown) and records it on the recording medium 25, and, upon receipt of the instruction to stop recording, finishes the recording of the video file.

Figures 1A, 1B, 1C, 1D:
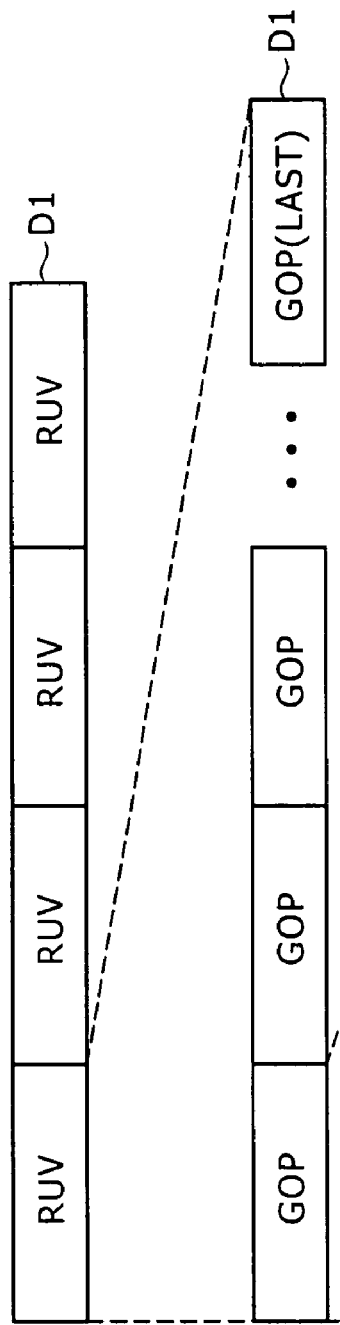
FIGS. 1A to 1D are diagrams for explaining a recording format adopted by a video camera in an editing system according to a first embodiment of the present invention.

In the above-described series of encoding processes, the encoding/decoding section 21 encodes the video and audio data while sequentially setting picture types according to a GOP structure defined by the MPEG-2 standard (see FIG. 1B). In addition, in the encoding of the video and audio data, the encoding/decoding section 21 groups a plurality of GOPs to form an RUV (Recording Unit of Video), which is a recording unit (see FIG. 1A), setting the number of GOPs contained in one RUV so that one RUV corresponds to one cell in a DVD format. Further, the encoding/decoding section 21 subjects the encoded video and audio data to time division multiplexing to have the same fixed-data-length pack structure as that of the DVD format (FIG. 1C) while using a private pack to provide a MV pack MVP at the top of each GOP. The term "private pack" as used herein refers to a pack that a user can arbitrarily define to use in the MPEG-2 format, and therefore, the user can use the pack also in the DVD format with the arbitrary definition given by the user. In the present embodiment, the MV pack MVP is defined as the private pack by setting of the header. In the above-described manner, the encoding/decoding section 21 multiplexes given data into the streaming data D1 while providing the MV pack MVP so as not to affect any process performed on the video and audio data in a device that adopts the MPEG-2 format or the DVD format as its standard.

The encoding/decoding section 21 assigns, to the MV pack MVP, specific information that includes information necessary for generating a navigation pack in the DVD format and is difficult to obtain without analyzing the packs containing the encoded video and audio data. Specifically, the encoding/decoding section 21 sets, in this specific information, information that is necessary for reproducing the video file and stores, in the MV pack MVP, information necessary in authoring and the like. By storing the information necessary for reproducing the video file in the MV pack MVP, the video camera 2 enables the navigation pack to be generated by reproducing the MV pack MVP and without the need to reproduce or analyze the video and audio data packs.

Specifically, the encoding/decoding section 21 forms the MV pack MVP by arranging a pack header at the top, and then, a system header, a packet header, and actual data (MV Data) in this order.

Referring to FIG. 3, the actual data (MV Data) of the MV pack MVP includes identification data (MV DAT ID) that indicates the MV pack MVP, a version (MV DAT VER) concerning the generation of the MV pack MVP, and a reserved field (reserved), which are arranged in this order from the top. The reserved field (reserved) is followed by information (MV APL) concerning an application of the MV pack MVP.

The information (MV APL) concerning the application of the MV pack MVP includes a name (VND NAME) of a vendor of a device that has recorded the video file, a product name (PRD NAME), an application identification code (APL ID), manufacturer information data (MNFI DATA) for identifying an entity that has described this stream, and a reserved field (reserved), which are arranged in this order.

Figures 4A, 4B:
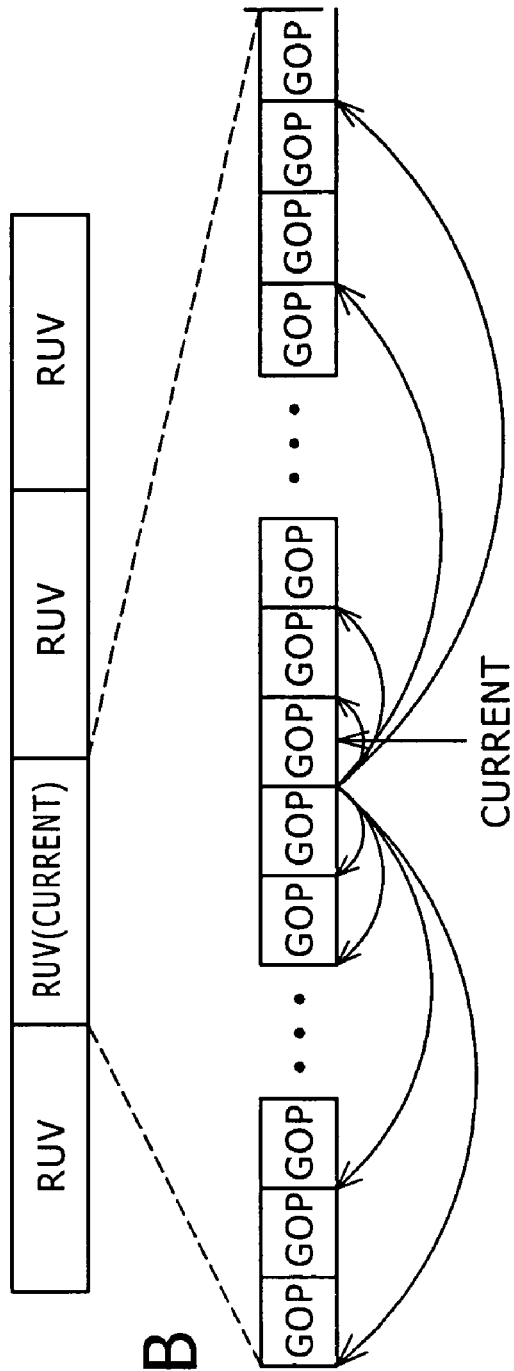
FIGS. 4A and 4B are diagrams for explaining position information assigned to the MV pack as illustrated in FIG. 3.

The actual data (MV Data) of the MV pack MVP further includes relative position information (GSI: GOP Search Information), which follows the information (MV APL). The relative position information (GSI) indicates relative positions relative to other GOPs in the same RUV. The relative position information (GSI) has assigned thereto validation information (GSI VALID) that defines whether the relative position information is valid or not, a reserved field (reserved), actual information (GOP Search Information) of the relative position information, and another reserved field (reserved). Referring to FIGS. 4A and 4B, the actual information (GOP Search Information) of the relative position information identifies the position of the top of each of the other GOPs in the same RUV (Current) to which the MV pack MVP belongs, in terms of the relative position relative to the position of the top of the navigation pack.

The actual data (MV Data) of the MV pack MVP further includes information (RSI: RUV Search Information) concerning the RUV to which the navigation pack belongs, which follows the relative position information (GSI). Referring also to FIGS. 5A to 5C, the information (RSI) concerning the RUV contains: the size (RUV SIZE) of the RUV to which the MV pack belongs; position information (PRERUV LGOP OFFSET) of the last GOP of the RUV immediately previous to the RUV to which the MV pack belongs; and a reserved field (reserved). The position information (PRERUV LGOP OFFSET) identifies the position of the last GOP of the immediately previous RUV in terms of the amount of offset relative to the address of the top of the RUV to which the navigation pack belongs.

Due to the above-described information, the streaming data D1 to be recorded on the recording medium 25 is generated so that the navigation pack can be generated by reproducing the MV pack MVP and without the need to analyze the video and audio data.

The actual data (MV Data) of the MV pack MVP further includes information (FFU DATA) necessary in authoring, which follows the information (RSI). Besides the above-described pieces of information, information of pack numbers and so on are assigned to the actual data (MV Data) of the MV pack MVP.

Referring to FIG. 6, for example, the information (FFU DATA) necessary in authoring includes information concerning the video data, the audio data, and a subpicture. The information concerning the video data includes a format related to the encoding of the video data (Video Stream), a format of the video data (TV System), a horizontal size (Horizontal Size), and so on. The information concerning the audio data includes the number of streams of the audio data (Number of Audio Streams), a format related to the encoding of the audio data (Audio Codec information), a sampling frequency (FS), and so on. Use of the above-described pieces of information enables easy generation of VTSI. In related art, because such information can be obtained by analyzing the video and audio packs, analysis of the packs is necessary. In the present embodiment, however, the use of the actual data of the MV pack MVP enables the generation of the VTSI without the need to analyze data stream.

In the present embodiment, the encoding/decoding section 21 generates the MV pack based on various information obtained by the processing section 34 and various information obtained in the encoding process, and records the streaming data D1 on the recording medium 25. In other words, with the likelihood of the recording onto a DVD which is an optical disk in view, the video camera 2 generates the streaming data D1 using the MPEG-2 technology such that conversion into streaming data in the DVD format is easy, and records the generated streaming data D1.

Meanwhile, at the time of monitoring the captured video recorded on the recording medium 25 (or the memory card 38), the encoding/decoding section 21 reads, out of the MV pack, the relative position information (GSI), which indicates the relative positions relative to other GOPs in the same RUV, and the information (RSI) concerning the RUV to which the navigation pack belongs, and outputs them to the processing section 34.

Based on the relative position information (GSI) and the information (RSI) concerning the RUV, which are obtained from the MV pack, the processing section 34 controls access of the disk interface 23 or the memory card interface 37 to the recording medium 25 (or the memory card 38) and, based on the information stored in the MV pack, reproduces the video file recorded in the form of the MPEG-2 streaming data.

Specifically, in the case of normal reproduction, in which a sequence of pictures are reproduced at the same speed and in the same order as they were recorded, the processing section 34 detects a recording start position of the next GOP and the size of the GOP from the information (RSI) concerning the RUV, respectively. Then, the processing section 34 issues a read command with the detected recording start position of the next GOP and the detected size of the GOP set as its parameters, thereby reproducing streaming data of the next GOP from the recording medium 25 or the memory card 38 to decode it in the encoding/decoding section 21. The processing section 34 repeats the above control and controls the overall operation so that normal-reproduction monitor images are displayed on the display section 35.

Similarly, in the case of reverse reproduction, in which the sequence of pictures are reproduced at the same speed as they were recorded but in the reverse order, the processing section 34 detects the recording start position of the previous GOP and the size of the GOP from the relative position information (GSI) and the information (RSI) concerning the RUV, respectively. Then, the processing section 34 issues a read command with the detected recording start position of the previous GOP and the detected size of the GOP set as its parameters, thereby reproducing streaming data of the previous GOP from the recording medium 25 or the memory card 38. Then, the streaming data thus reproduced is decoded and rearranged by the encoding/decoding section 21 and displayed on the display section 35. When the previous GOP is contained in the previous RUV in the above series of processes, the processing section 34 detects the recording start position of the last GOP of the previous RUV from the information (RSI) concerning the RUV and issues the read command accordingly.

In the case of fast forward reproduction or fast reverse reproduction, the issuance of the read command and the decoding of the streaming data are performed in the above-described manner, and some of the decoded pictures are selectively discarded in accordance with the reproduction speed while the remaining pictures are displayed.

In the above-described manners, the video camera 2 makes effective use of the information stored in the MV pack to reproduce the captured video file recorded on the recording medium 25 or the memory card 38.

Figure 7:
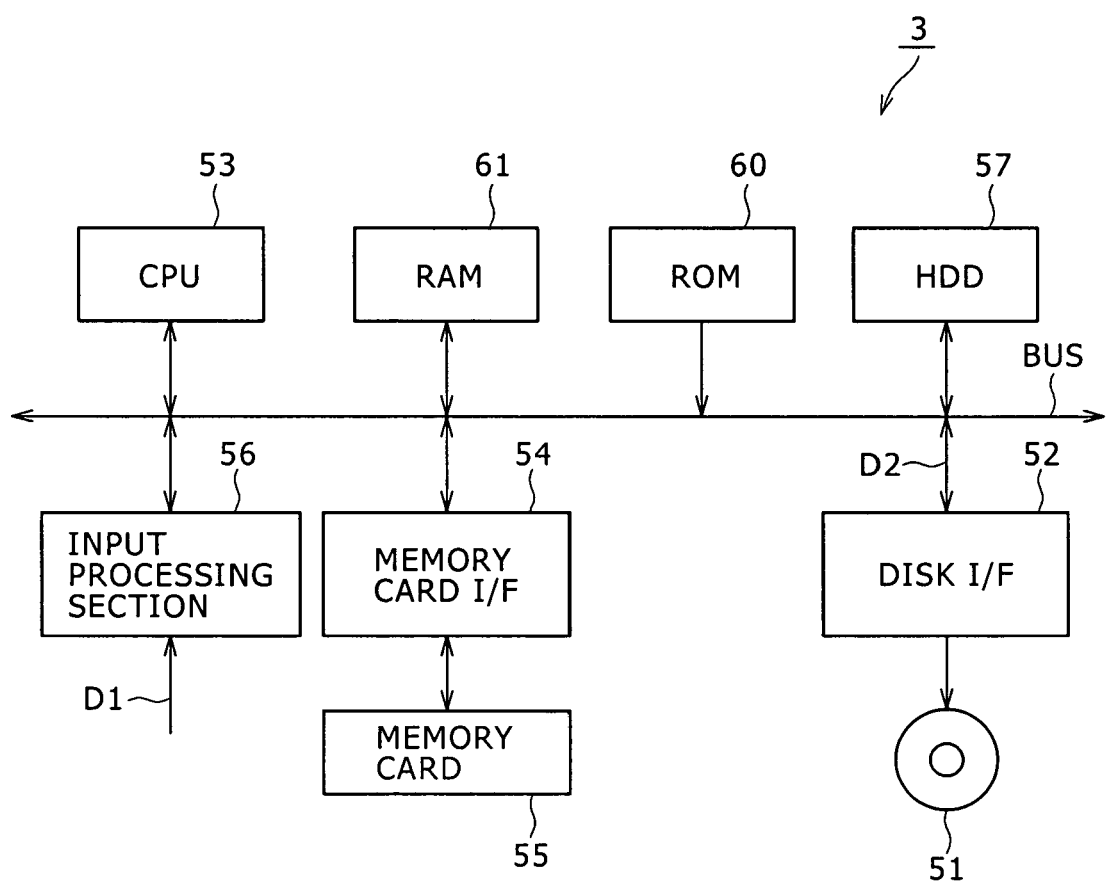
FIG. 7 is a block diagram illustrating an editing apparatus applied to the editing system of FIG. 2.

FIG. 7 is a block diagram illustrating the structure of the editing apparatus 3 according to the present embodiment. The editing apparatus 3 is formed by a personal computer, and performs authoring on the streaming data D1 outputted from the video camera 2 and records it on a DVD such as an optical disk 51.

In the editing apparatus 3, under control of a central processing unit 53, a disk interface (a disk I/F) 52 records on the DVD 51 streaming data D2 in the DVD format outputted to a BUS, and also reproduces various data recorded on the DVD 51 and outputs them to the BUS.

Under control of the central processing unit 53, a memory card interface (a memory card I/F) 54 outputs various data recorded on a memory card 55 to the BUS and also, conversely, records various data outputted to the BUS on the memory card 55.

An input processing section 56 is an interface for input of various data outputted from the output processing section 27 of the video camera 2 and, under control of the central processing unit 53, outputs to the BUS the streaming data D1 outputted from the video camera 2. In the present embodiment, the captured video can be downloaded to the editing apparatus 3 via the input processing section 56, which connects the editing apparatus 3 with the video camera 2, or via the memory card 55.

A hard disk drive (HDD) 57 is used to store an operating system related to processing by the central processing unit 53, various application programs, the video file downloaded from the video camera 2, etc., and, under control of the central processing unit 53, stores data outputted to the BUS and also outputs data stored therein to the BUS.

The central processing unit 53 is a controller to control the operation of the editing apparatus 3. In accordance with data recorded on a read-only memory (ROM) 60, the central processing unit 53 secures a work area in a random-access memory (RAM) 61 and starts the operating system stored in the hard disk drive 57, thereby starting the overall operation. Thereafter, in accordance with a user operation, the central processing unit 53 executes an application program related to processing in the editing apparatus and stored in the hard disk drive 57. By the execution of the application program related to the processing in the editing apparatus 3, the central processing unit 53 controls operations of various parts in accordance with user operations and thereby allows the computer to function as the editing apparatus.

Specifically, when the user has issued an instruction to download the video file from the video camera 2, the central processing unit 53 controls the memory card interface 54 or the input processing section 56 to acquire the captured video file from the video camera 2 via the memory card 55 or the input processing section 56, and stores the acquired video file in the hard disk drive 57.

When the user has issued an instruction to monitor the video file stored in the hard disk drive 57, data in the video file stored in the hard disk drive 57 are sequentially read and decoded, and then displayed on a display section (not shown). In the case where an extension of the video file indicates that it is a video file downloaded from the video camera 2 and containing the MV packs, the central processing unit 53 makes effective use of the MV packs in the same manner as described above with respect to the video camera 2 to reproduce the video file from the hard disk drive 57. While reproducing the video file in such a manner, the central processing unit 53 accepts an editing point set by the user and, in response to a user operation, performs a preview process. When the user has issued an instruction to perform recording onto the DVD 51 after acceptance of the editing point and creation of an edition list, the central processing unit 53 reproduces the data in the video file stored in the hard disk drive 57 sequentially based on the edition list and records them on the DVD 51.

Note that, at the time of monitoring and editing the video file downloaded into the hard disk drive 57, the information (FFU DATA) necessary in authoring and stored in the MV pack may be used to switch various settings related to monitoring and editing.

When performing recording onto the DVD, the central processing unit 53 converts the streaming data of the video file sequentially reproduced from the hard disk drive 57 into the pack structure according to the DVD file format as described above with reference to FIGS. 12A to 14B and temporarily stores the resultant data in the hard disk drive 57. Then, the central processing unit 53 sets management information, such as VMG, in the stored streaming data having the pack structure and records the resultant data on the DVD 51.

In the above-described series of processes, in the case where the streaming data of the video file which is reproduced from the hard disk drive 57 and converted into the DVD file format is streaming data downloaded from the video camera 2 and containing the MV packs, the streaming data is processed such that the RUV and the GOP are respectively set as a cell (Cell) and VOBU, and the MV pack is replaced with the navigation pack as illustrated in FIGS. 8A to 8C, which are comparable with FIGS. 1A to 1C, whereby the streaming data in the DVD format is generated by a simple process.

At this time, the navigation pack can be generated from the relative position information (GSI) to other GOPs within to the same RUV and the information (RSI) concerning the RUV stored in the MV pack without the need to reproduce or analyze the video and audio packs in the GOP to which the MV pack belongs.

Specifically, the central processing unit 53 detects a start PTS (VOBU SPTS) and end PTS (VOBU EPTS) of each VOBU, a start address of the MV pack, etc., based on the relative position information (GSI), and generates the navigation pack based on the detection and replaces the MV pack with the generated navigation pack.

Note that the conversion into the streaming data in the DVD format may be performed such that the MV pack is defined as a private pack in the DVD format and the NV pack is provided separately.

2. Operation of Embodiment

In the editing system 1 (FIG. 2) having the above-described structure, the captured video obtained in the video camera 2 is downloaded to the editing apparatus 3, and the editing apparatus 3 performs authoring and recording onto the DVD.

In the video camera 2, the video and audio data of the captured video obtained by the camera section 6 are inputted to the encoding/decoding section 21 of the recording/reproducing processing section 7, where the video and audio data are compressed using the MPEG-2 technology to generate the encoded data, and the encoded data is subjected to time division multiplexing to generate the streaming data D1 in MPEG-2 format. Further, the streaming data D1 is recorded on the recording medium 25 or the memory card 38, and the streaming data recorded on the recording medium 25 or the memory card 38 is downloaded to the editing apparatus 3.

In the above-described series of processes in the video camera 2, with the likelihood of recording onto the DVD which is an optical disk in view, the encoded video and audio data (FIG. 1) are multiplexed to generate the streaming data D1 having the same fixed-data-length pack structure as that of the streaming data in the DVD format. Thus, the video camera 2 simplifies the conversion of the streaming data D1 into the streaming data in the DVD format, which shortens the time necessary for recording onto the DVD as compared with in related art.

Having the same data structure as the streaming data in the DVD format, the streaming data D1 is provided with the MV pack, which is contained and multiplexed in each GOP and contains the specific information that includes information necessary for generating the navigation pack and is difficult to obtain without analyzing the video and audio data packs (FIG. 3).

Because of this, in the editing system 1, it is possible to generate the navigation pack without bothering to reproduce and analyze the video and audio data packs, which simplifies the conversion into the streaming data in the DVD format and thereby shortens the time necessary for recording onto the DVD as compared with in related art.

Further, because the MV pack is generated as a private pack, the generation thereof does not affect a series of processes related to decoding or the like performed in a device that does not handle the MV pack and processes common streaming data in MPEG-2 format.

Specifically, in the video camera 2, the RUV composed of a plurality of GOPs and corresponding to the cell (Cell) is set as the unit of recording, and the MV pack is formed of the position information that identifies the positions of the tops of other GOPs within the same recording unit, the information of the size of the recording unit, and the position information that identifies the position of the top of the last GOP of the previous recording unit (FIGS. 4A to 5C). This serves to shorten the time necessary for recording onto the DVD as compared with in related art.

Further, in the video camera 2, the MV pack is arranged at the top of each GOP, i.e., at a position corresponding to the top of each VOBU, where the navigation pack is arranged. Therefore, the streaming data in the DVD format can be generated by simply replacing the MV pack with the navigation pack without manipulating the various recording position information stored in the MV pack, i.e., without newly setting NV PCK SCR, etc., to be assigned to the navigation pack. This further shortens the time necessary for recording onto the DVD as compared with in related art.

Still further, in the video camera 2, the MV pack is generated with the information (FFU DATA) necessary in authoring stored therein. Therefore, this information (FFU DATA) can be used to simplify or enhance the speed of various processes.

The video file recorded on the recording medium 25 or the memory card 38 and downloaded to the editing apparatus 3 (FIG. 7) is held in the hard disk drive 57 and, by processing by the central processing unit 53, reproduced for the user to monitor and, further, for the creation of the edition list. Further, based on this edition list, the data of the video file is sequentially reproduced from the hard disk drive 57 and converted into the streaming data in the DVD format and stored in the hard disk drive 57. Then, the streaming data in the DVD format is recorded on the DVD 51.

In the above-described series of processes, the video file downloaded to the editing apparatus 3 is converted into the streaming data in the DVD format while the RUV and the GOP in the video file are respectively set as the cell (Cell) and the VOBU, and the navigation pack is generated from the information stored in the MV pack. This considerably shortens the time necessary in the editing apparatus 3 for recording onto the DVD as compared with in related art.

Further, the MV pack is replaced with the navigation pack for the conversion into the streaming data in the DVD format. This also considerably shortens the time necessary for recording onto the DVD as compared with in related art.

3. Effects of Embodiment

According to the above-described embodiment, while the compressed video and audio data are multiplexed so as to have the fixed-data-length pack structure according to the optical disk format, the specific information that includes the information necessary for generating the navigation pack and is difficult to obtain without analyzing the video and audio data packs is assigned to each GOP in the streaming data to be multiplexed. This serves to considerably shorten the time necessary for recording onto the DVD as compared with in related art.

Further, because the specific information is the position information that identifies the positions of the tops of other GOPs within the same recording unit, the information of the size of the recording unit, and the position information that identifies the position of the top of the last GOP in the previous recording unit, the navigation pack can be generated without reproducing and analyzing the video and audio packs. Thus, the time necessary for recording onto the DVD can be considerably shortened as compared with in relater art.

Still further, since the pack containing the specific information is arranged at the top of each GOP, the streaming data can be generated by replacing this pack with the navigation pack without manipulating the position information represented by the specific information. Thus, the time necessary for recording onto the DVD can be considerably shortened as compared with in relate art.

That is, in the editing apparatus, the navigation pack is generated using the specific information, and the generated navigation pack is used to set each recording unit as a Cell and generate the streaming data used for recording onto the DVD. Thus, the time necessary for recording onto the DVD can be considerably shortened as compared with in related art.

Still further, the pack containing the specific information is replaced with the navigation pack to generate the streaming data used for recording onto the DVD. This also serves to considerably shorten the time necessary for recording onto the DVD as compared with in related art.

Second Embodiment

Use of the streaming data D1 in MPEG-2 format generated by the video camera 2 according to the first embodiment enables efficient data transmission because, by simply transmitting the RUV or GOP data, transmission of the information necessary for reproduction at the reproduction end is also achieved without the need to transmit reproduction control information separately. In this embodiment, this advantage is applied to a video transmission method.

Figure 9:
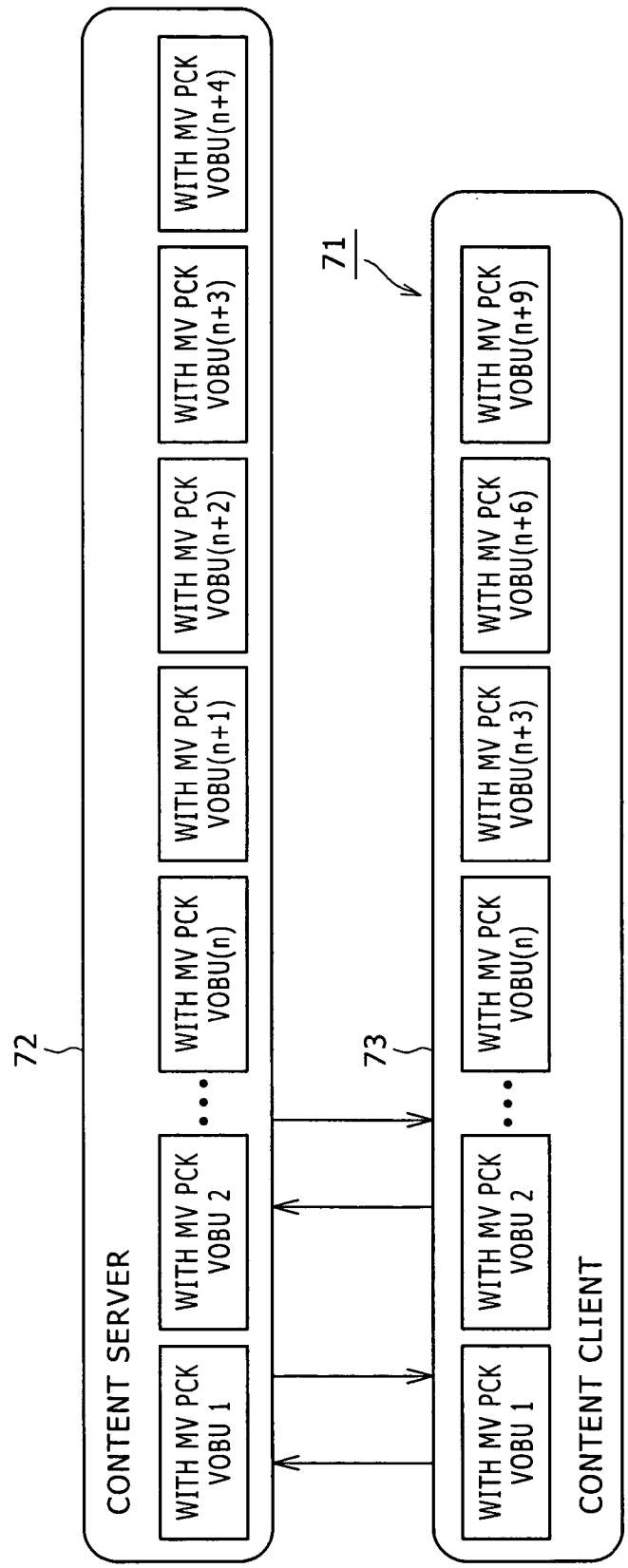
FIG. 9 is a block diagram illustrating a video transmission system according to a second embodiment of the present invention.
Figures 10A, 10B, 10C, 10D:
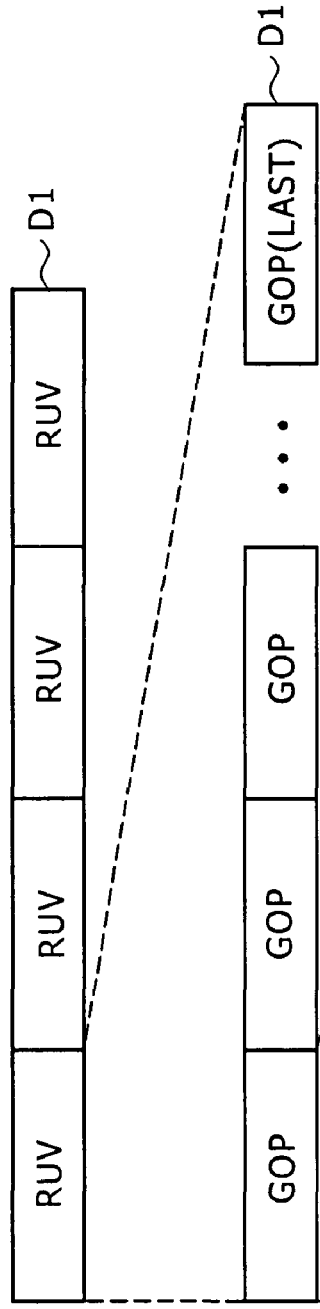
FIGS. 10A to 10D are diagrams for explaining an editing system according to a third embodiment of the present invention.
Figure 12A:
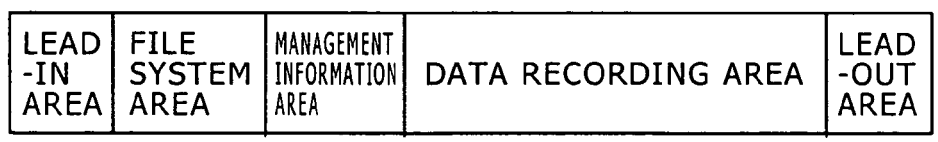
FIGS. 12A to 12D are diagrams for explaining a DVD format.
Figure 12B:
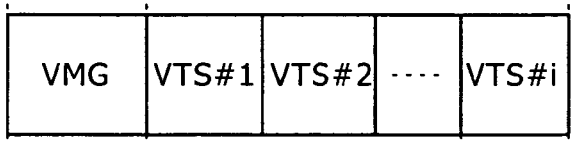
Figure 12C:
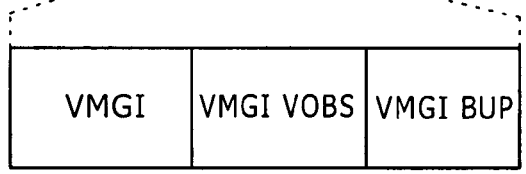
Figure 12D:
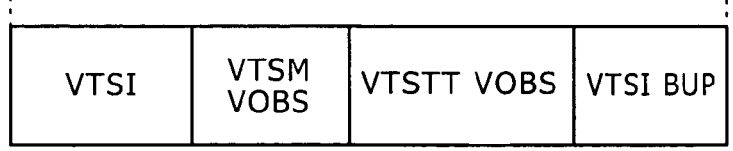
Figure 13A:
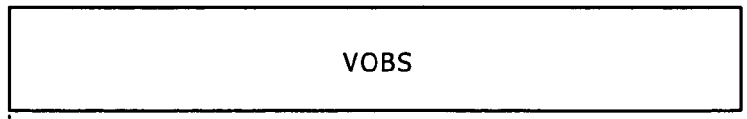
FIGS. 13A to 13F are diagrams illustrating the structure of VOBS.
Figure 13B:
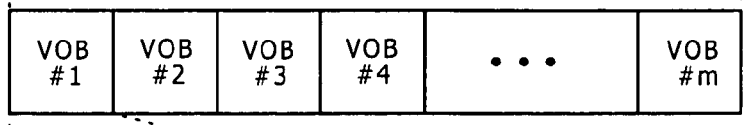
Figure 13C:
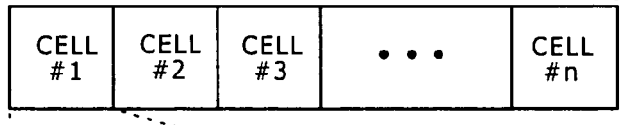
Figure 13D:
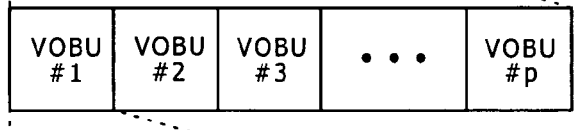
Figure 13E:
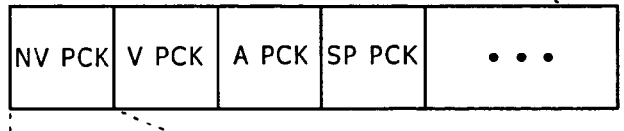
Figure 13F:
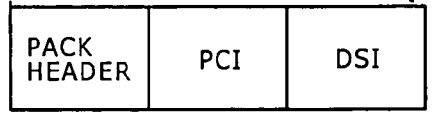

FIG. 9 is a diagram illustrating the configuration of a video transmission system 71 according to a second embodiment of the present invention. In the video transmission system 71, a content server 72 has stored therein a video file and, in response to a request from a content client 73, sends the stored file to the content client 73.

The content client 73 is a computer capable of accessing the content server 72 via the Internet. In response to a user operation, the content client 73 accesses the content server 72.

The content server 72 is a computer having a large-capacity hard disk drive, similar to the computer as described above with reference to FIG. 7, and capable of accepting access from the content client 73 via the Internet. The content server 72 records and holds, in the hard disk drive, a video content in the form of a VOB file according to the DVD format using the VOBUs each having as its private pack the MV pack, which has been described above with reference to FIGS. 1A to 1D and FIG. 3. In addition, with a homepage set up on the Internet, the content server 72 sends the video content in response to a request from the content client 73, the request being made by a user who views the homepage.

The content server 72 sends, to the content client 73 connected to the content server 72 via a transmission path, the streaming data generated by subjecting the compressed and encoded video and audio data to time division multiplexing so as to have the fixed-data-length pack structure according to the DVD format. In addition, the specific information that is difficult to obtain without analyzing the video and audio data packs contained in the streaming data thus generated by multiplexing and is necessary for reproducing the streaming data is assigned to each GOP using the private packs in the streaming data to be multiplexed.

In this video transmission system 71, when the request for transmission of the video file has been issued from the content client 73, the content server 72 sends one or more VOBUs, corresponding to the top part of the video file, to the content client 73. Upon receipt of the one or more VOBUs thus transmitted, the content client 73 decodes the one or more VOBUs and, in response to a user instruction, performs normal reproduction or fast forward reproduction, for example, thereby presenting the decoded video content to the user. The fast forward reproduction is achieved by selectively reproducing only I pictures, for example. At this time, by using the MV pack set in the VOBU, the content client 73 is able to reproduce the transmitted VOBUs sequentially to present them to the user, and outputs a request for transmission of subsequent VOBUs specifying one or more of the other VOBUs belonging to the same Cell and, eventually, the first VOBU in the following Cell.

In response to such a transmission request, the content server 72 sends the one or more of the other VOBUs belonging to the same Cell and, eventually, the first VOBU in the following Cell. Note that, in a similar manner, except in the top part of the video file, it is possible to issue a transmission request specifying the last VOBU in a Cell previous to the Cell to which the already-received VOBU belongs.

In the video transmission system 71, the video content in the form of the video file is transmitted by repetition of issuance of such a transmission request and transmission of the streaming data using the VOBUs in response to the issuance of the transmission request. Thus, the video content using the VOBUs is efficiently transmitted such that the video file can be reproduced in the content client 73. FIG. 9 shows an exemplary case where the content server 72 transmits a sequence of VOBUs to the content client 73 while selectively omitting some of the VOBUs constituting the video file, and the content client 73 performs fast forward reproduction.

Note that the video file may be transmitted using the streaming data in MPEG format having as a private pack the MV pack, which has been described above with reference to FIGS. 1A to 1D, instead of using the VOB file in the DVD format.

In this embodiment, while the compressed video and audio data are multiplexed so as to have the fixed-data-length pack structure according to the optical disk format, the specific information that includes the information necessary for generating the navigation pack and is difficult to obtain without analyzing the video and audio data packs is assigned to each GOP in the streaming data to be multiplexed, whereby efficient transmission of the video file is achieved.

Third Embodiment

FIGS. 10A to 10D are diagrams illustrating streaming data in MPEG-2 format applied to an editing system according to a third embodiment of the present invention. These figures are comparable with FIGS. 1A to 1D. The editing system according to the present embodiment has the same structure as that of the above-described editing system 1 according to the first embodiment except that the structure of the streaming data in MPEG-2 is different.

In the editing system according to the present embodiment, information necessary in authoring is separately multiplexed to the streaming data using an additional recording information pack (ARI PCK) as a private pack. As illustrated in FIG. 11, the additional recording information pack (ARI PCK) is constructed of recording time information, information of conditions at the time of video capturing, etc.

In this embodiment, in the editing apparatus, the streaming data in the DVD format is generated such that the MV pack and the additional recording information pack (ARI PCK) are replaced with the NV pack, for example. Alternatively, it may be so arranged that one of the MV pack and the additional recording information pack (ARI PCK) is replaced with the NV pack while the other is defined as a private pack in the DVD format. Alternatively, it may be so arranged that both of the MV pack and the additional recording information pack (ARI PCK) are defined as a private pack in the DVD format while the NV pack is provided separately.

As described above, the effects of the first embodiment can also be obtained by adding the information necessary in authoring using a separate private pack as in this embodiment.

Fourth Embodiment

The above-described embodiments have been described with reference to the case where the video file is recorded on a DVD. However, the present invention is not limited to this. The present invention can also be widely applied to various other cases, such as the case where the video file is recorded on an optical disk using another format such as the DVD video recording standard. In the DVD video recording standard, RDI PCK corresponds to the navigation pack.

It should be understood by those skilled in the art that various modifications, combinations, sub-combinations and alterations may occur depending on design requirements and other factors insofar as they are within the scope of the appended claims or the equivalents thereof.

The invention claimed is:

1. A video recording apparatus, comprising:
   a data acquisition section configured to acquire video data and audio data;
   an encoding section configured to compress the acquired video data and audio data to generate encoded video and audio data while setting a sequence of group of pictures for the acquired video data and audio data, and to subject the encoded video and audio data to time division multiplexing to output streaming data; and
   a recording section configured to record the streaming data on a recording medium,
   wherein with a predetermined number of groups of pictures corresponding to a cell in an optical disk format being set as a recording unit, the encoding section generates the streaming data by the time division multiplexing of the encoded video and audio data using fixed-data-length packs according to the optical disk format,
   the encoding section multiplexes to the streaming data specific information that includes information necessary for generating a navigation pack in the optical disk format without reproducing and analyzing the packs containing the encoded video and audio data, such that the specific information is assigned to each of the groups of pictures using a private pack in the streaming data, and
   the specific information contained in each of the groups of pictures includes position information that identifies a position of a top of a last group of pictures belonging to the immediately previous recording unit.

2. The video recording apparatus according to claim 1, wherein the specific information contained in each of the groups of pictures is a combination of position information that identifies a position of a top of another group of pictures within the recording unit, information of a size of the recording unit, and the position information that identifies a position of a top of a last group of pictures belonging to the immediately previous recording unit.

3. The video recording apparatus according to claim 1, wherein the private pack containing the specific information is arranged at a top of the group of pictures.

4. A video recording apparatus, comprising:
   a streaming data acquisition section configured to acquire first streaming data;
   a data processing section configured to convert the first streaming data into second streaming data used for recording onto an optical disk; and
   an optical disk recording section configured to record the second streaming data section onto the optical disk,
   wherein with a predetermined number of groups of pictures corresponding to a cell in an optical disk format being set as a recording unit, the first streaming data is generated by time division multiplexing of encoded video and audio data obtained by compressing video data and audio data using fixed-data-length packs according to the optical disk format,
   specific information that includes information necessary for generating a navigation pack in the optical disk format without reproducing and analyzing the packs containing the encoded video and audio data is contained in the first streaming data, such that the specific information is assigned to each of the groups of pictures using a private pack in the first streaming data to be multiplexed,
   the data processing section is configured to generate the navigation pack in the optical disk format using the specific information, and to generate the second streaming data so as to be recorded onto the optical disk using the navigation pack and to set the recording unit as the cell, and
   the specific information contained in each of the groups of pictures includes position information that identifies a position of a top of a last group of pictures belonging to the immediately previous recording unit.

5. The video recording apparatus according to claim 4, wherein the private pack containing the specific information is arranged at a top of the group of pictures, and the data processing section is configured to replace the private pack containing the specific information with the navigation pack to generate the second streaming data so as to be recorded on the optical disk.

6. A video recording method, comprising:
   acquiring video data and audio data;
   compressing the acquired video data and audio data to generate encoded video and audio data while setting a sequence of group of pictures for the acquired video data and audio data, and subjecting the encoded video and audio data to time division multiplexing to output streaming data; and
   recording the streaming data on a recording medium,
   wherein with a predetermined number of groups of pictures corresponding to a cell in an optical disk format being set as a recording unit, the compressing step includes generating the streaming data by the time division multiplexing of the encoded video and audio data using fixed-data-length packs according to the optical disk format, and multiplexing to the streaming data specific information that includes information necessary for generating a navigation pack in the optical disk format without reproducing and analyzing the packs containing the encoded video and audio data, such that the specific information is assigned to each of the groups of pictures using a private pack in the streaming data, and the specific information contained in each of the groups of pictures includes position information that identifies a position of a top of a last group of pictures belonging to the immediately previous recording unit.

7. A video recording method, comprising:
acquiring first streaming data;
converting the first streaming data into second streaming data used for recording onto an optical disk; and
recording the second streaming data onto the optical disk,
wherein with a predetermined number of groups of pictures corresponding to a cell in an optical disk format being set as a recording unit, the first streaming data is generated by time division multiplexing of encoded video and audio data obtained by compressing video data and audio data using fixed-data-length packs according to the optical disk format,
specific information that includes information necessary for generating a navigation pack in the optical disk format without reproducing and analyzing the packs containing the encoded video and audio data is contained in the first streaming data, such that the specific information is assigned to each of the groups of pictures so as to be multiplexed using a private pack in the first streaming data,
the converting step includes generating the navigation pack in the optical disk format using the specific information, and generating the second streaming data using the navigation pack and setting the recording unit as the cell, and
the specific information contained in each of the groups of pictures includes position information that identifies a position of a top of a last group of pictures belonging to the immediately previous recording unit.

8. A video transmission method for transmitting, to a content client connected to a transmission source via a transmission path, streaming data generated by subjecting encoded data obtained by compressing video data and audio data to time division multiplexing using fixed-data-length packs, the method comprising:
multiplexing to the streaming data specific information without reproducing and analyzing the packs containing the encoded video and audio data and that is necessary for reproducing the streaming data, such that the specific information is assigned to each of a plurality of groups of pictures using a private pack in the streaming data; and
transmitting the streaming data including the specific information multiplexed thereto in the multiplexing step,
wherein the specific information contained in each of the groups of pictures includes position information that identifies a position of a top of a last group of pictures belonging to the immediately previous recording unit.

9. The video transmission method according to claim 8, wherein one or more of the groups of pictures constitute a processing unit corresponding to a cell in an optical disk format, the specific information is information necessary for generating a navigation pack in the optical disk format, and the private pack containing the specific information is arranged at a top of the group of pictures.

10. A processor encoded with a computer program to implement a video recording method for recording a video on a recording medium, the method comprising:
acquiring video data and audio data of the video;
compressing the acquired video data and audio data to generate encoded video and audio data while setting a sequence of group of pictures for the acquired video data and audio data, and subjecting the encoded video and audio data to time division multiplexing to output streaming data; and
recording the streaming data on the recording medium,
wherein with a predetermined number of groups of pictures corresponding to a cell in an optical disk format being set as a recording unit, the compressing step includes generating the streaming data by the time division multiplexing of the encoded video and audio data using fixed-data-length packs according to the optical disk format, and multiplexing to the streaming data specific information that includes information necessary for generating a navigation pack in the optical disk format without reproducing and analyzing the packs containing the encoded video and audio data, such that the specific information is assigned to each of the groups of pictures using a private pack in the streaming data, and the specific information contained in each of the groups of pictures includes position information that identifies a position of a top of a last group of pictures belonging to the immediately previous recording unit.

11. A processor encoded with a computer program to implement a video recording method for recording a video on an optical disk, the method comprising:
acquiring first streaming data;
converting the first streaming data into second streaming data used for recording onto the optical disk; and
recording the second streaming data onto the optical disk,
wherein with a predetermined number of groups of pictures corresponding to a cell in an optical disk format being set as a recording unit, the first streaming data is generated by time division multiplexing of encoded video and audio data obtained by compressing video data and audio data using fixed-data-length packs according to the optical disk format,
specific information that includes information necessary for generating a navigation pack in the optical disk format without reproducing and analyzing the packs containing the encoded video and audio data is contained in the first streaming data, such that the specific information is assigned to each of the groups of pictures using a private pack in the first streaming data so as to be multiplexed,
the converting step includes generating the navigation pack in the optical disk format using the specific information, and generating the second streaming data so as to be recorded onto the optical disk using the navigation pack and setting the recording unit as the cell, and
the specific information contained in each of the groups of pictures includes position information that identifies a position of a top of a last group of pictures belonging to the immediately previous recording unit.

12. A non-transitory storage medium recorded with a program to be executed by a processor to implement a video recording method for recording a video on a recording medium, the method comprising:
acquiring video data and audio data of the video;
compressing the acquired video data and audio data to generate encoded video and audio data while setting a sequence of group of pictures for the acquired video data and audio data, and subjecting the encoded video and audio data to time division multiplexing to output streaming data; and
recording the streaming data on the recording medium, wherein with a predetermined number of groups of pictures corresponding to a cell in an optical disk format being set as a recording unit, the compressing step includes generating the streaming data by the time division multiplexing of the encoded video and audio data using fixed-data-length packs according to the optical disk format, multiplexing to the streaming data specific information that includes information necessary for generating a navigation pack in the optical disk format without reproducing and analyzing the packs containing the encoded video and audio data, such that the specific information is assigned to each of the groups of pictures using a private pack in the streaming data, and the specific information contained in each of the groups of pictures includes position information that identifies a position of a top of a last group of pictures belonging to the immediately previous recording unit.

13. A non-transitory storage medium recorded with a program to be executed by a processor to implement a video recording method for recording a video on an optical disk, the method comprising:

acquiring first streaming data;

converting the first streaming data into second streaming data used for recording onto the optical disk; and recording the second streaming data onto the optical disk, wherein with a predetermined number of groups of pictures corresponding to a cell in an optical disk format being set as a recording unit, the first streaming data is generated by time division multiplexing of encoded video and audio data obtained by compressing video data and audio data using fixed-data-length packs according to the optical disk format, specific information that includes information necessary for generating a navigation pack in the optical disk format without reproducing and analyzing the packs containing the encoded video and audio data is contained in the first streaming data, such that the specific information is assigned to each of the groups of pictures using a private pack in the first streaming data so as to be multiplexed, the converting step includes generating the navigation pack in the optical disk format using the specific information, and generating the second streaming data so as to be recorded onto the optical disk using the navigation pack and setting the recording unit as the cell, and the specific information contained in each of the groups of pictures includes position information that identifies a position of a top of a last group of pictures belonging to the immediately previous recording unit.

* * * * *